United States Patent [19]

Lacroix et al.

[11] 4,111,650
[45] Sep. 5, 1978

[54] STABLE CONCENTRATED LIQUID PREPARATION OF A PAPER DYE OF THE COPPER PHTHALOCYANINE CLASS

[75] Inventors: Roger Lacroix, Huningue, France; Roland Haberli, Wurenlingen, Switzerland

[73] Assignee: Ciba-Geigy Corporation, Ardsley, N.Y.

[21] Appl. No.: 701,450

[22] Filed: Jun. 30, 1976

[30] Foreign Application Priority Data

Jul. 3, 1975 [CH] Switzerland .......... 8674/75

[51] Int. Cl.$^2$ .......... D06P 1/384; D06P 1/14; C09B 47/04; D21H 3/80
[52] U.S. Cl. .......... 8/85 R; 8/1 XA; 8/7; 260/314.5; 162/162; 8/92
[58] Field of Search .......... 8/1 XA, 7, 85 R; 260/314.5; 162/162

[56] References Cited

U.S. PATENT DOCUMENTS

| | | | |
|---|---|---|---|
| 2,863,875 | 12/1958 | Bienert et al. | 260/314.5 |
| 2,989,360 | 6/1961 | Mautner | 8/85 A |
| 3,148,933 | 9/1964 | Randall et al. | 260/314.5 |
| 3,651,058 | 3/1972 | Poole et al. | 8/1 XA |
| 3,784,599 | 1/1974 | Jefferies | 8/7 |
| 3,954,796 | 5/1976 | Kuster | 260/314.5 |
| 4,039,346 | 8/1977 | Kranz | 260/314.5 |
| 4,048,189 | 9/1977 | Kienzle | 8/1 XA |

FOREIGN PATENT DOCUMENTS 2,301,479  6/1973  Fed. Rep. of Germany ........ 260/314.5

*Primary Examiner*—Joseph L. Schofer
*Assistant Examiner*—Maria S. Tungol
*Attorney, Agent, or Firm*—Edward McC. Roberts; Prabodh I. Almaula; Michael W. Glynn

[57] ABSTRACT

There is disclosed a stable concentrated liquid preparation of a paper dye of the copper phthalocyanine class, which preparation contains 15 to 50 per cent by weight of the dye of the formula

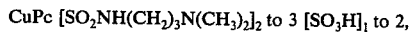

wherein CuPc denotes copper phthalocyanine, optionally in the form of an alkali salt, especially in the form of the sodium salt, dissolved in 30 to 65 per cent by weight of water, 5 to 15 per cent by weight of N-methylpyrrolidone, 1 to 7 per cent by weight of benzyl alcohol, and 1 to 5 per cent by weight of a lower aliphatic carboxylic acid and the use of this preparation for the dyeing and printing of paper, semi-cardboard and cardboard.

4 Claims, No Drawings

STABLE CONCENTRATED LIQUID PREPARATION OF A PAPER DYE OF THE COPPER PHTHALOCYANINE CLASS

The invention relates to a stable concentrated liquid preparation of a paper dye of the copper phthalocyanine class, to processes for producing it, and to its use for dyeing in particular paper dyeing.

Liquid preparations of paper dyes should contain the dye in the dissolved form, so that a good dispersion, e.g. in the paper pulp, is ensured. Furthermore, such preparations should be stable in storage and easy to handle; and, from the point of view of health, should contain no toxic solvents.

There has now been found a liquid preparation of a paper dye of the copper phthalocyanine class, which preparation surprisingly combines within itself all the desired properties.

The liquid preparation according to the invention contains 15 to 50, preferably 20 to 25, percent by weight of the dye of the formula

wherein CuPc denotes copper phthalocyanine, optionally in the form of an alkali salt, especially in the form of the sodium salt, dissolved in 30 to 65, preferably 50 to 65, percent by weight of water, 5 to 15, preferably 8 to 12, percent by weight of N-methylpyrrolidone, 1 to 7, preferably 4 to 6, percent by weight of benzyl alcohol, and 1 to 5, preferably 4 to 5, percent by weight of a lower aliphatic carboxylic acid such as, in particular, formic acid or acetic acid.

The addition of benzyl alcohol and of the lower aliphatic carboxylic acid serves above all to establish the desired viscosity and stability of the liquid preparation.

This new liquid preparation is a solution. It is thinly liquid; has a viscosity of about 140 to 170 cPs/20° C.; is stable in storage over several months at temperatures of between about −15° and +50° C.; is soluble in cold water and in warm water in any proportion; and may be considered as being toxicologically safe.

This liquid preparation is produced for example by stirring the copper phthalocyanine paper dye as defined, either as pure material or as aqueous press cake, at room temperature into the solvent mixture as defined until a solution exists, which is the case after about 2 hours; and then filtering this solution through, for example, a polyamide filter.

A liquid preparation of this kind is used, optionally after dilution with water, especially for the dyeing and printing of paper, semi-cardboard and cardboard, whereby these materials can be dyed, e.g., in the pulp, by brushing or by immersion. Furthermore, such a liquid preparation can be employed also for a continuous or discontinuous dyeing process for textile materials.

The following Examples illustrate the invention. "g" denotes gram, and temperatures are given in degrees Centigrade. "SR" denotes "Schopper Riegler" and, except where otherwise stated, % values are expressed as percent by weight.

EXAMPLE 1

There is dispersed in a 1500 ml beaker in the course of about 15 minutes, at room temperature, 450 g of an aqueous dye press cake (53% of water and 47% of dye) containing the dye of the formula

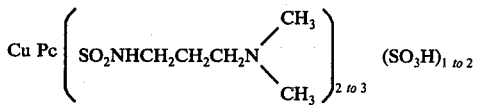

in 260 g of water, and to this dispersion there is added at room temperature a mixture of 100 g of water, 95 g of N-methyl-2-pyrrolidone, 50 g of benzyl alcohol and 45 g of formic acid (98%). The whole is stirred vigorously for about 120 minutes and subsequently filtered through a polyamide filter. There is obtained an acid liquid preparation (solution — pH-value 4 to 5) containing 21 percent by weight of the above-mentioned dye, 60 percent by weight of water, 9.5 percent by weight of N-methyl-2-pyrrolidone, 5 percent by weight of benzyl alcohol and 4.5 percent by weight of formic acid (98%), the preparation having a viscosity of 150 cPs at 20°.

A like solution is obtained by using, instead of 45 g of formic acid, identical amounts of acetic acid (98–100%).

The two liquid preparations, both that with formic acid and that with acetic acid, are stable in storage for about 3 months in the temperature range of −15° to +50°, and are furthermore very readily soluble in cold water in any proportion, and are used for the dyeing of paper.

EXAMPLE 2

PRINTING PAPER 800 kg of bleached sulphate cellulose and 200 kg of bleached sulphite cellulose in the as supplied condition are placed into a pulper containing 14 cubic meters of industrial water, and beaten up until free from specks. The beating up operation requires 30 minutes. The beaten-up cellulose is then transferred to a discharge vat. From this vat the cellulose suspension is ground by means of pulp mills to a degree of fineness of 25°SR, and is subsequently fed into a mixing vat. There is then added to the pulp in the mixing vat 250 kg of kaolin Ia (as filler), as well as 0.1 to 0.05 % of the dye formulation according to Example 1, based on the weight of absolutely dry fibre. After 15 minutes' absorption time, there are added 2% of resin glue, based on the weight of absolutely dry cellulose and, after 10 minutes, 4% of alum, based on the weight of absolutely dry cellulose. In the normal course of the process, this paper pulp is then fed to the paper machine and from this is obtained a printing paper dyed in a blue shade.

EXAMPLE 3

TISSUE PAPER 1000 kg of bleached sulphate cellulose in the as supplied condition is placed into a pulper containing 14 cubic meters of industrial water, and beaten up until free from specks, an operation requiring 30 minutes. The beaten-up cellulose is subsequently transferred to a discharge vat, and from this vat it is ground by means of pulp mills to degree of fineness of 25°SR; the cellulose is then fed into a mixing vat. An addition is made in the mixing vat of 0.1 to 0.05% of the dye formulation according to Example 1, relative to the weight of absolutely dry fibre. After 15 minutes' absorption time, this paper pulp passes in the normal course of the process to the paper machine, from which emerges a tissue paper dyed in a blue shade.

EXAMPLE 4

SIZING PRESS APPLICATION 5 kg of dye in the form of a solvent-containing formulation according to Example 1 is dissolved in 1000 liters of a 10% aqueous anionic starch solution (soluble starch which is oxidatively hydrolysed), and the solution is applied by way of a sizing press to a paper web. The applied amount of the above solution is 1.5 g/m² of absolutely dry paper per side. There is obtained a paper dyed in a blue shade.

We claim:

1. A stable concentrated liquid preparation of a paper dye of the copper phthalocyanine class, which preparation contains 15 to 50 percent by weight of the dye of the formula $$CuPc\ [SO_2NH(CH_2)_3N(CH_3)_2]_{2\ to\ 3}\ [SO_3H]_{1\ to\ 2}$$

wherein
CuPc represents copper phthalocyanine, or the alkali salt thereof, dissolved in 30 to 65 percent by weight of water, 5 to 15 percent by weight of N-methylpyrrolidone, 1 to 7 percent by weight of benzyl alcohol, and 1 to 5 percent by weight of a lower aliphatic carboxylic acid.

2. A liquid preparation according to claim 1, wherein said lower aliphatic carboxylic acid is formic acid or acetic acid.

3. A liquid preparation according to claim 1, which contains 20 to 25 percent by weight of said dye, 50 to 65 percent by weight of water, 8 to 12 percent by weight of N-methylpyrrolidone, 4 to 6 percent by weight of benzyl alcohol and 4 to 5 percent by weight of the lower aliphatic alcohol.

4. The liquid preparation according to claim 1, wherein the dye is in the form of the sodium salt thereof.

* * * * *